United States Patent [19]
Kanaoka et al.

[11] 3,891,669
[45] June 24, 1975

[54] THIOL-GROUP DETECTING FLUORESCENCE REAGENTS

[75] Inventors: Yuichi Kanaoka; Minoru Machida, both of Sapporo, Japan

[73] Assignee: Yuichi Kanaoka, Tokyo, Japan

[22] Filed: Sept. 11, 1973

[21] Appl. No.: 396,321

[30] Foreign Application Priority Data
Apr. 2, 1973 Japan................................ 48-37584

[52] U.S. Cl........... 260/326.34; 260/343.2 R; 424/7
[51] Int. Cl............................................. C07d 27/18
[58] Field of Search................................ 260/326.34

[56] References Cited
UNITED STATES PATENTS
3,394,145   7/1968   Bublitz...................... 260/326.5 FM

*Primary Examiner*—Joseph A. Narcavage
*Attorney, Agent, or Firm*—Scrivener Parker Scrivener & Clarke

[57] ABSTRACT

Thiol-group detecting fluorescence reagents consisting, principally, of N-(4-methyl-7-dimethylaminocoumarinyl)maleimides and process for the preparation thereof.

1 Claim, No Drawings

THIOL-GROUP DETECTING FLUORESCENCE REAGENTS

This invention relates to thiol-group detecting fluorescence reagents having in the reagent molecules a maleimide group for selectively reacting with thiol groups (i.e. those thiol groups found in low molecular weight compounds as well as in biopolymers such as proteins, and other biological systems), and a dimethylaminocoumarin portion serving at the reaction as the principal fluorophore emitting fluorescence, as well as to a process for the preparation of such reagents.

As a result of our extensive study in search of such a reagent that itself won's fluoresce at all but that after specifically reacted and coupled with thiol groups will emit conspicuous fluorescence to make it possible to confirm the presence of the thiol groups, we have now found that N-3(or 6)-(4-methyl-7-dimethylaminocoumarinyl) maleimide have chemical and physicochemical properties satisfying the requirements for use as a tracer reagent for labelling thiol groups with fluoroescence, thus accomplishing the present invention.

The reagents according to the present invention has many profittable characteristics as enumerated below.

i. The reaction is specific and sensitive and the reagents react well with even a very small amount of thiol groups to emit easily detectable fluorescence, which makes it possible not only to make a quantitative analysis of low molecular weight thiol compounds, but also to capture the thiol groups in biopolymers such as proteins, and in other biological systems.

ii. The fluorescence resulting from coupling of the reagent with thiol groups occurs at 450 nm or longer wavelengths in the visible region. To take the 3-substituted compound as an example, when an exciting light with a wavelength of 380 nm is used, the quantum yield in ethanol is 0.11 and the fluorescence maximum is at 477 nm. Thus the quantum yield is relatively high.

iii. The molecular absorption coefficient of the fluorophore is high (higher than 20,000), which results in emission of fluorescence of high intensity and thus in high detection sensitivity.

iv. The water solubility of the reagent is relatively good in comparison to other fluorescent dye-stuffs since the fluorophores consist of only two condensed rings with polar groups such as the coumarin carbonyl.

The N-(4-methyl-7-dimethylaminocoumarinyl)-substituted maleimides which may be used in the present invention can be prepared by condensing 4-methyl-7-dimethylaminocoumarin bearing 3- or 6-amino group with maleic anhydride and cyclizing the resultant N-(4-methyl-7-dimethyl-aminocoumarinyl)maleamic acid to form the maleimide ring.

This reaction may be depicted by the following reaction formulas with the 3-amino compound as an example:

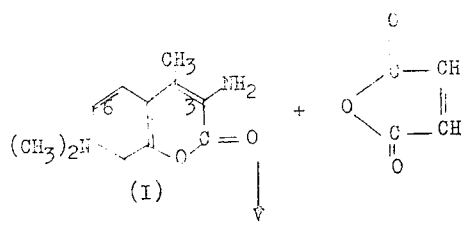

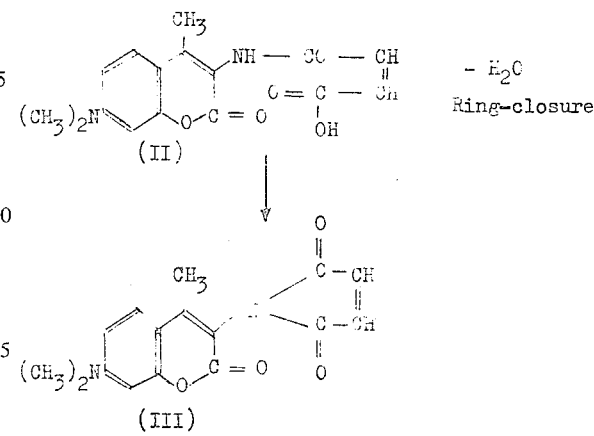

I. 3-amino-4-methyl-7-dimethylaminocoumarin
II. N-3-(4-methyl-7-dimethylaminocoumarinyl)maleamic acid
III. N-3-(4-methyl-7-dimethylaminocoumarinyl)maleimide N-3-(4-methyl-7-dimethylaminocoumarinyl)maleimide is, when recrystallized from ethyl acetate, in the form of yellow needle-shaped crystals having a melting point of from 218° to 219.5°C.

Elemental analysis (as $C_{16}H_{14}N_2O_4$)

|  | C | H | N |
|---|---|---|---|
| Calcd. | 64.42 | 4.73 | 9.39 |
| Found | 64.36 | 4.65 | 9.35 |

N-6-(4-methyl-7-dimethylaminocoumaryl)maleimide is, when recrystallized from ethanol, in the form of orange needle-shaped crystals having a melting point of from 222° to 223.5°C.

Elemental analysis (as $C_{16}H_{14}N_2O_2$)

|  | C | H | N |
|---|---|---|---|
| Calcd. | 64.42 | 4.73 | 9.39 |
| Found | 64.60 | 4.69 | 9.19 |

The N-(4-methyl-7-dimethylaminocoumarinyl)maleimides according to the present invention having the above enumerated characteristics is applicable not only to the fluorometric quantitative analysis of thiol compounds in amounts as small as $10^{-6}$ to $10^{-3}$ mole, but also over a wide variety of biochemical or physiological studies as well as fundamental or clinical medical studies with tissue samples and body fluids from the living bodies: histochemical test for detecting thiol groups under a microscope; quantitative determination of thiol-containing proteins or peptides; studies on the function of the thiol groups in the enzyme; detection of thiol groups in the living bodies, for example in membranes, cells, tissues or organs; studies on the relationship between the structure and function of such components of the living bodies; metabolic or clinical analysis based upon quantitative determination of the thiol groups in varied secreting fluids or other clinical samples, as well as fundamental studies on the automatic system for such analysis, etc.

The present invention will be further illustrated by the following example.

4-Methyl-7-dimethylaminocoumarin is reacted in acetic anhydride (besides this, acetic acid, sulfuric acid or hydrofluoric acid may be used) with a slight excess of nitric acid (specific gravity = 1.42) with ice cooling and the reaction mixture decomposed by pouring into ice water to give the nitro compounds which are then separated by chromatography on silica gel using 3 : 1 of benzene: ethyl acetate to give 35% of 3-nitro product having a melting point of from 210° to 212°C, 25% of 6-nitro product having a melting point of from 193° to 195°C, and 5% of 8-nitro product having a melting point of from 163° to 165°C.

These products, when subjected to catalytic reduction using palladium-on-carbon in ethanol, give the corresponding amino products in good yield.

The above described procedure may be represented by the following reaction formulas:

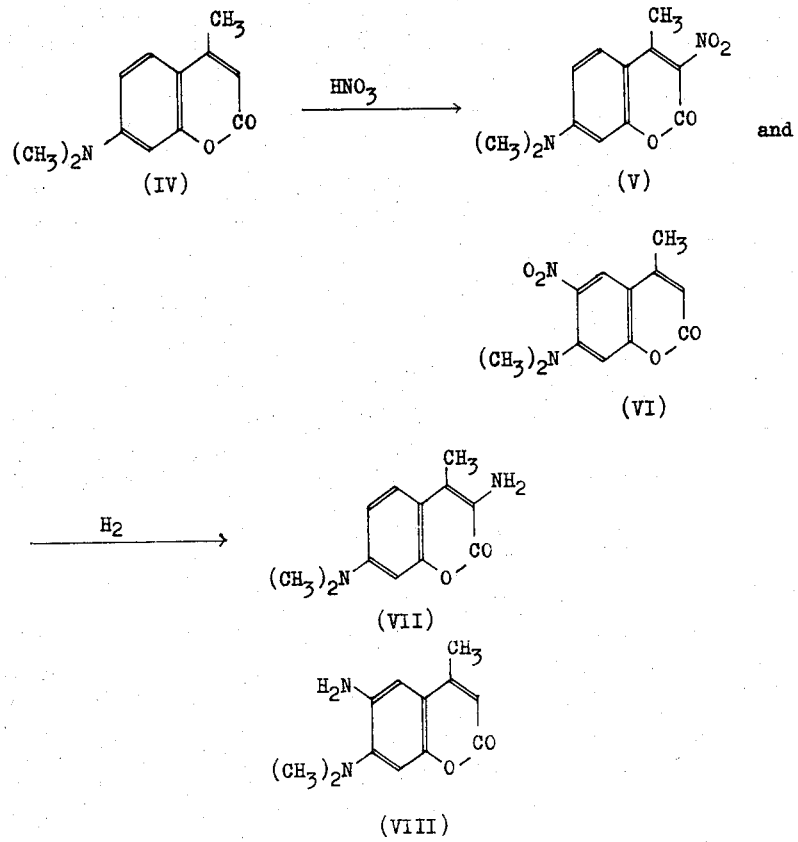

IV. 4-methyl-7-dimethylaminocoumarin
V. 3-nitro-4-methyl-7-dimethylaminocoumarin
VI. 6-nitro-4-methyl-7-dimethylaminocoumarin
VII. 3-amino-4-methyl-7-dimethylaminocoumarin
VIII. 6-amino-4-methyl-7-dimethylaminocoumarin Both the 3-amino- and 6-amino-products form yellow needle-shaped crystals.

Elemental analysis with the 3-amino-4-methyl-7-dimethylaminocoumarin having a melting point of form 148° to 150°C is as follows:

|  | C | H | N |
|---|---|---|---|
| Calcd. | 66.03 | 6.47 | 12.84 |
| Found | 66.10 | 6.45 | 13.00 |

Elemental analysis of the 6-amino-4-methyl-7-dimethylaminocoumarin having a melting point of from 220° to 226°C is as follows:

|  | C | H | N |
|---|---|---|---|
| Calcd. | 66.03 | 6.47 | 12.84 |
| Found | 65.99 | 6.48 | 12.79 |

1.4 grams of maleic anhydride is dissolved in 15ml of chloroform and stirred with ice cooling. To this solution is added a solution of 2.2 grams of the above described 3-amino-4-methyl-7-dimethylaminocoumarin in 40 ml of tetrahydrofuran, which results, after a while, in precipitation of yellow crystals. After allowed to stand overnight the crystals are filtered off. Yield is 80%. M.P. 205° to 207°C.

Elemental analysis (as $C_{16}H_{16}N_2O_3$)

|  | C | H | N |
|---|---|---|---|
| Calcd. | 60.75 | 5.10 | 8.86 |
| Found | 60.75 | 5.16 | 9.11 |

The similar procedure with the 6-amino product gives yellow crystals having a melting point of from 190° to 193°C in yield 87%.

Elemental analysis (as $C_{16}H_{16}N_2O_3$)

|  | C | H | N |
|---|---|---|---|
| Calcd. | 60.75 | 5.10 | 8.86 |
| Found | 60.05 | 5.11 | 8.80 |

1.0 gram of the above described maleamic acid is heated, together with 0.1 gram of sodium acetate and 5 ml of acetic anhydride, at 100°C for a period of 15 minutes and then poured into ice water. The reaction mixture is extracted with ethyl acetate and the extract is washed first with a saturated aqueous sodium hydrogen carbonate solution and then with an aqueous sodium chloride solution and dried over anhydrous sodium sulfate. The solvent is then distilled off and the residue recrystallized from ethyl acetate. There are obtained yellow needle-shaped crystals. Yield is 68 %.

The product is N-(3-(4-methyl-7-dimethylaminocoumarinyl)) maleimide.

In the same way, there is obtained N-(6-(4-methyl-7-dimethylaminocoumarinyl)) maleimide in yield 50 %.

In the following will be given some test examples using the reagent according to the present invention.

a. Example of quantitative determination of thiol group:

An aqueous solution containing glutathione in a concentration of ca. $10^{-6}$ mole is admixed in a phosphate buffer (pH 6–7) at 0°C with an excess of the reagent according to the present invention and after 20 minutes, the thiol content is measured on a fluorophotometer on the basis of the calibration curve obtained with a standard solution.

b. Example of reaction with protein:

45 mg of egg albumin is dissolved in 20 ml of a 0.1 ml phosphate buffer (pH 7.0) and a solution of 20mg of the reagent according to the present invention (the 3-maleimide compound) in 2 ml of dimethoxyethane added, with the resultant mixture being incubated at 4°C for a period of 18 hours. The mixture is then dialysed and liophilized.

From the results of measurement of the resultant specimen for fluorescene and for ultraviolet absorption, it can be seen that the reagent according to the present invention be introduced into 80 % of the thiol groups, i.e. 80 % of the thiol groups in the protein be coupled with the reagent. The remaining 20 % are left uncoupled presumably became the thiol group is in some sterically hindered environment in the protein molecule.

It should be noted that the wavelengths at which the fluorescence of the addition products between the reagents in the invention and the thiol compounds have are in the longer wavelength region and therefore clearly distinguishable from the fluorescence resulting from the tryptophane or tyrosine constructing the skeleton of the proteins. Likewise, visible microscopic examination can be performed for histochemical purposes. This facts constitutes another notable advantageous feature of the present invention.

What is claimed is:

1. A thiol-group detecting fluorescence reagent selected from the group consisting of:
   N-3-(4-methyl-7-dimethylaminocoumarinyl)maleimide, and
   N-6-(4-methyl-7-dimethylaminocoumarinyl)maleimide.

\* \* \* \* \*